(12) United States Patent
Duvall et al.

(10) Patent No.: US 9,636,957 B2
(45) Date of Patent: May 2, 2017

(54) TRUCK TOWING SYSTEM AND ASSEMBLY

(71) Applicant: Truckmovers.Com, Inc., Independence, MO (US)

(72) Inventors: L. Thomas Duvall, Kansas City, MO (US); Dean West, Kansas City, MO (US); Jeff Brawley, Kansas City, MO (US)

(73) Assignee: TRUCKMOVERS.COM, INC., Kansas City, MO (US)

( * ) Notice: Subject to any disclaimer, the term of this patent is extended or adjusted under 35 U.S.C. 154(b) by 50 days.

(21) Appl. No.: 14/531,478

(22) Filed: Nov. 3, 2014

(65) Prior Publication Data

US 2015/0048594 A1 Feb. 19, 2015

Related U.S. Application Data

(63) Continuation of application No. 13/762,992, filed on Feb. 8, 2013, now Pat. No. 8,876,139, which is a continuation of application No. 12/967,860, filed on Dec. 14, 2010, now Pat. No. 8,371,599.

(51) Int. Cl.
| | | |
|---|---|---|
| B60P 3/06 | (2006.01) |
| B60D 1/155 | (2006.01) |
| B60D 1/01 | (2006.01) |
| B60D 1/14 | (2006.01) |
| B60P 3/12 | (2006.01) |
| B62D 53/04 | (2006.01) |
| B60D 1/48 | (2006.01) |

(52) U.S. Cl.
CPC .............. *B60D 1/155* (2013.01); *B60D 1/01* (2013.01); *B60D 1/14* (2013.01); *B60D 1/143* (2013.01); *B60D 1/486* (2013.01); *B60P 3/125* (2013.01); *B62D 53/04* (2013.01)

(58) Field of Classification Search
CPC . B60D 1/155; B60D 1/01; B60D 1/14; B60D 1/143; B60D 1/486; B60P 3/125; B62D 53/04
USPC .............................. 280/402, 414.5; 414/563
See application file for complete search history.

(56) References Cited

U.S. PATENT DOCUMENTS

| | | | |
|---|---|---|---|
| 1,283,415 | A | 10/1918 | Kruger |
| 2,436,000 | A | 11/1945 | Fleming |
| 2,707,113 | A | 2/1953 | Powlick |
| 3,764,163 | A | 10/1973 | Ortman et al. |

(Continued)

FOREIGN PATENT DOCUMENTS

| | | |
|---|---|---|
| EP | 49637 A1 | 4/1982 |
| GB | 778055 | 7/1957 |

(Continued)

*Primary Examiner* — Kevin Hurley
*Assistant Examiner* — Michael Stabley
(74) *Attorney, Agent, or Firm* — Polsinelli PC

(57) ABSTRACT

A truck towing system is described. The truck towing system provides for a first truck to tow a second truck in a back to front relationship, i.e., the front portion of the second truck (the towed truck) is connected or attached to a rear portion of the first truck (the towing truck). The truck towing system includes an upper member to connect with a first truck. A middle member joins the upper member and a lower member in a fixed engagement. The lower member supports a front portion of a second truck. A beam member is engaged to the lower member, and the beam member extends and retracts from an interior of the lower member. The beam member connects to a rear portion of the second truck.

19 Claims, 5 Drawing Sheets

(56) References Cited

U.S. PATENT DOCUMENTS

| | | |
|---|---|---|
| 3,840,252 A | 10/1974 | Jocoy |
| 3,881,749 A | 5/1975 | Berends |
| 4,047,733 A | 9/1977 | Parkes |
| 4,316,617 A | 2/1982 | Flaugh |
| 4,586,866 A | 5/1986 | Kvamme |
| 4,632,629 A | 12/1986 | Kooima |
| 4,664,585 A | 5/1987 | Ambridge et al. |
| 4,832,358 A | 5/1989 | Bull |
| 4,842,472 A | 6/1989 | Plant |
| 4,861,221 A | 8/1989 | Krisa |
| 4,949,985 A | 8/1990 | Lichter |
| 5,048,854 A | 9/1991 | Clark |
| 5,163,803 A | 11/1992 | Marola |
| 5,249,911 A | 10/1993 | Marola |
| 5,322,314 A | 6/1994 | Blum |
| 5,391,044 A | 2/1995 | Young |
| 5,566,964 A | 10/1996 | Leonard |
| 5,672,042 A | 9/1997 | Bartel |
| 5,762,465 A | 6/1998 | Zackovich |
| 5,797,614 A | 8/1998 | Hord et al. |
| 5,806,872 A | 9/1998 | Szczypski |
| 5,845,920 A | 12/1998 | Hill |
| 5,906,386 A | 5/1999 | Baker et al. |
| 5,941,550 A | 8/1999 | Szczypski |
| 5,988,664 A | 11/1999 | Hill |
| 5,988,974 A | 11/1999 | Zackovich |
| 6,036,428 A | 3/2000 | Kooima |
| 6,050,627 A | 4/2000 | Lee |
| 6,095,748 A | 8/2000 | Zackovich |
| 6,224,082 B1 | 5/2001 | Landoll et al. |
| 6,378,887 B2 | 4/2002 | Landoll et al. |
| 6,488,307 B2 | 12/2002 | Koon |
| 6,502,845 B1 | 1/2003 | Van Vleet |
| 6,854,756 B1 | 2/2005 | Solberg |
| 7,156,591 B2 | 1/2007 | Marola |
| 7,188,856 B2 | 3/2007 | Maynard |
| 7,461,855 B2 | 12/2008 | Klar |
| 7,510,205 B2 | 3/2009 | Bellezza et al. |
| 8,047,758 B2 | 11/2011 | Watkins |
| 8,348,589 B2 | 1/2013 | Watkins |
| 8,613,583 B1 | 12/2013 | Watkins |
| 2004/0075242 A1 | 4/2004 | Richards |
| 2008/0036176 A1 | 2/2008 | Schuettenberg |
| 2008/0157504 A1 | 7/2008 | Schuettenberg |
| 2009/0322057 A1 | 12/2009 | Quenzi et al. |
| 2010/0044998 A1 | 2/2010 | Franchineau |
| 2010/0320726 A1 | 12/2010 | Watkins |
| 2012/0045307 A1 | 2/2012 | Watkins |

FOREIGN PATENT DOCUMENTS

| | | |
|---|---|---|
| GB | 933792 | 8/1963 |
| GB | 1288444 | 9/1972 |
| GB | 1355285 A | 6/1974 |
| GB | 2040847 A | 9/1980 |
| GB | 2061193 A | 5/1981 |
| GB | 2120620 A | 12/1983 |
| WO | 9718104 A1 | 5/1997 |
| WO | 2007146666 A2 | 12/2007 |
| WO | 2009097307 A1 | 8/2009 |

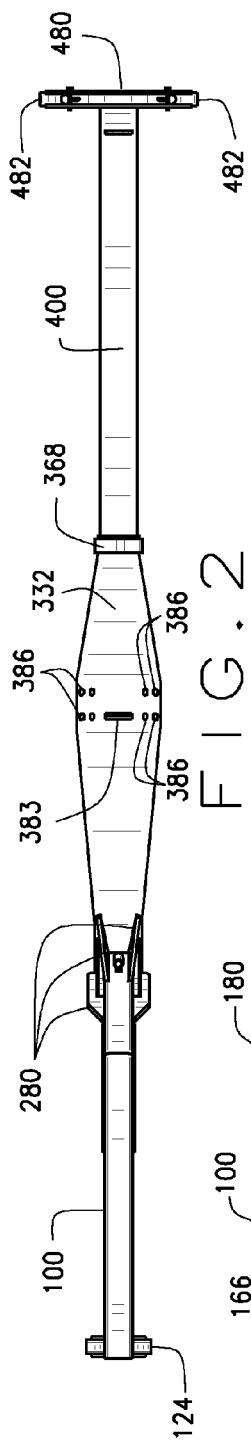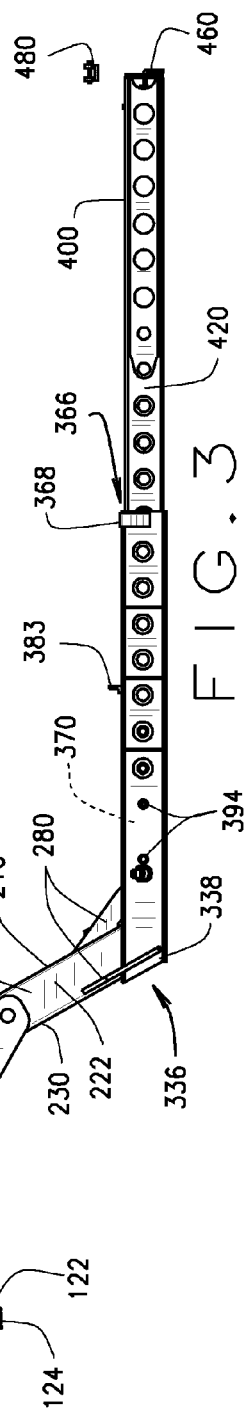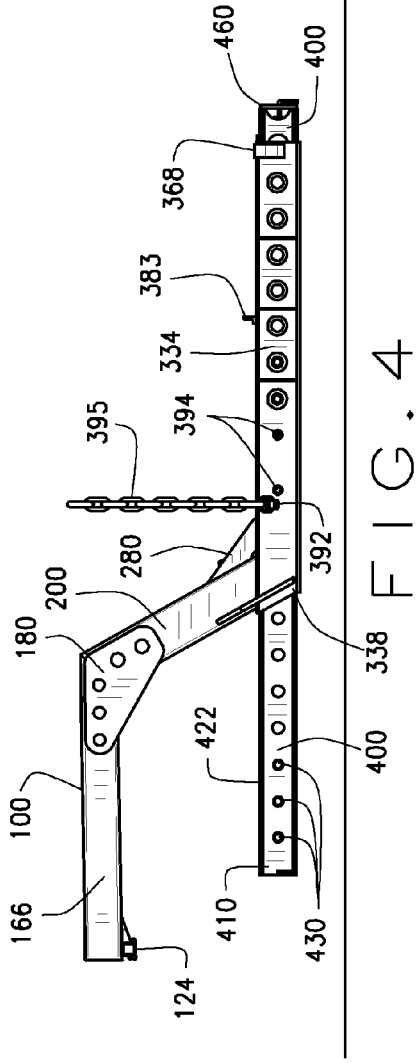

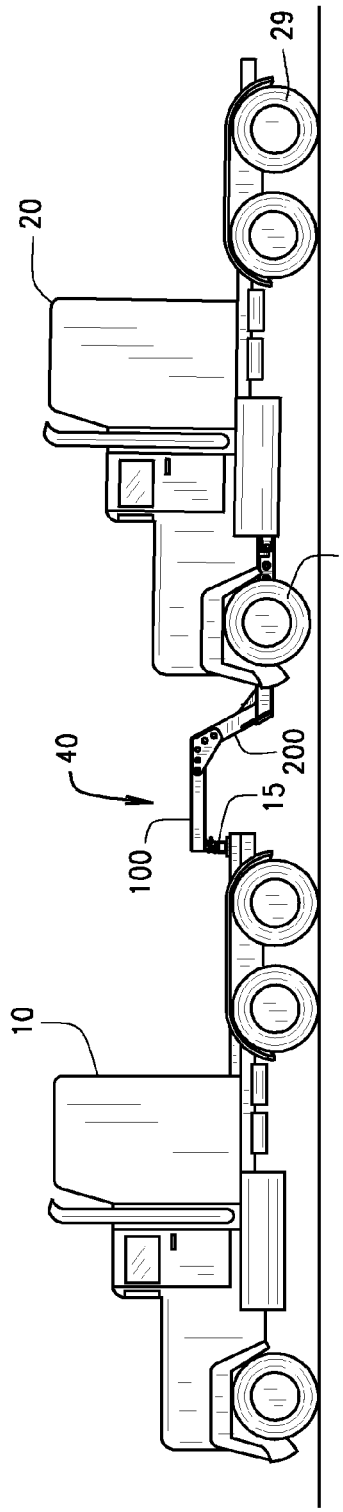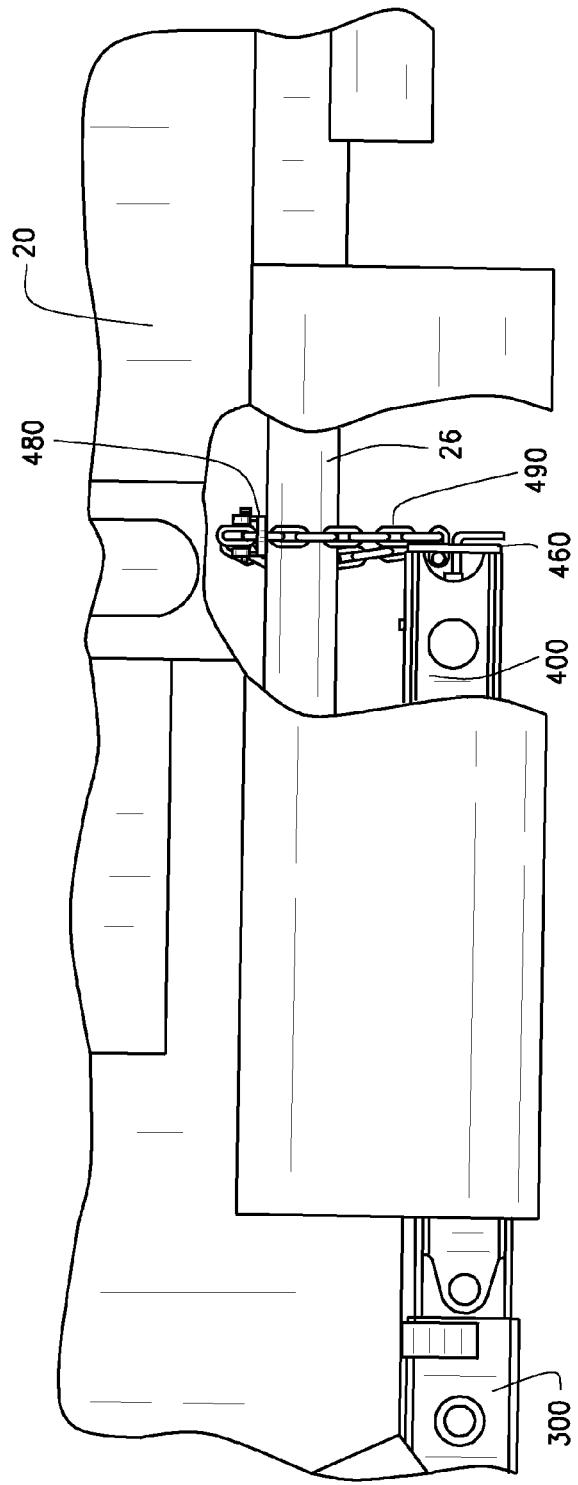

TRUCK TOWING SYSTEM AND ASSEMBLY

CROSS REFERENCE TO RELATED APPLICATION

This application is a continuation of U.S. Pat. No. 8,876, 139, issued Nov. 4, 2014, which is a continuation of U.S. Pat. No. 8,371,599 issued Feb. 12, 2013, which both are hereby incorporated by reference in their entireties.

FIELD OF INVENTION

The present invention relates to a truck towing system and assembly.

BACKGROUND OF INVENTION

Previous attempts of towing or transporting semi-trucks have used a method called "decking," in which a first truck tows a second truck with an axle assembly of the second truck positioned over a rear portion or frame of the first truck. The method does not work with many modern trucks that have an increased height, since a top of the second truck will be too high off of the ground resulting in problems passing through tunnels or under over-passes and possible violation of laws or regulations directed to maximum vehicle height.

Other attempts in towing semi-trucks use a method in which the truck that is being towed is towed in reverse. This method is fuel inefficient, since the towed truck is moving in a direction counter to its aerodynamic design. Further, towing in reverse may damage the suspension or the air fairings of the towed truck

SUMMARY OF INVENTION

A truck towing system and assembly are herein described. The truck towing system and assembly provide for a first truck to tow a second truck in a back to front relationship, i.e., the front portion of the second truck (the towed truck) is connected or attached to a rear portion of the first truck (the towing truck). This allows the first truck to tow the second truck in a fuel efficient manner, as trucks are not generally designed to be aerodynamic when driven in or pulled in a reverse direction.

The truck towing system and assembly also allows for the towed truck to be maintained at a height where a top surface or a roof of the towed truck is maintained below approximately 13 feet, 6 inches, which is a typical maximum height for safe clearance on most highways and interstates. Many of today's semi-trucks are built with cabins or condos above and behind the driver's seat in the cab. These areas may contain a bed or other storage area. These additions to the cab create extra height that must be accommodated by the towing equipment.

The truck towing system and assembly allows a single driver to move two or more trucks to a destination. This reduces labor and travel costs since two drivers are not required.

The truck towing system and assembly further provide for the towed truck to have its rear wheels on the ground, while its front wheels are lifted. This provides the driver of the first truck with better control over the second truck. This also reduces the likelihood of the towed trucked to start "snaking," which may result in a loss of control.

The truck towing system and assembly further is adjustable to accommodate different sized semi-trucks. The assembly may extend or retract depending on the length of the towed vehicle.

The truck towing system and assembly further collapses into a collapsed configuration that has a reduced size. In the collapsed configuration, the assembly may be easily lifted with a crane, a hoist, or other lifting apparatus. In the collapsed configuration, a center of gravity of the assembly is positioned approximately in the middle of the collapsed towing assembly, thus allowing an easy two point attachment to the collapsed towing assembly. Further, the collapsed configuration provides for more efficient storage and transportation of multiple towing assemblies.

In one aspect, a truck towing system is provided. The truck towing system includes an upper member to removably connect with a first truck, a middle member, and a lower member. The middle member joins the upper member and the lower member in a fixed engagement. The lower member supports a front portion of a second truck. A beam member is engaged to the lower member. The beam member connects to a rear portion of the second truck.

In another aspect, a truck towing system is provided. The truck towing system includes an upper member to removably connect with a first truck, a middle member, and a lower member. The middle member joins the upper member and the lower member. The lower member supports a front portion of a second truck. A beam member is engaged to the lower member to pass through a front opening and a rear opening of the lower member. The lower member defines an interior to receive the beam member. The beam member connects to a rear portion of the second truck. The lower member includes one or more sets of openings that are spaced along the length of the lower member. The beam member includes one or more sets of pin openings that are spaced along the length of the beam member. A locking pin passes through one of the sets of the openings in the lower member and one of the sets of the pin openings in the beam member to lock the beam member and the lower member together.

In another aspect, a method of connecting a truck towing system to a first truck and a second truck is provided. The method includes providing a towing assembly having an upper member that removably connects with the first truck, a middle member, and a lower member. The middle member joins the upper member and the lower member. The lower member supports a front portion of a second truck. A beam member is engaged to the lower member. The beam member connects to a rear portion of the second truck. The method further includes extending or retracting the beam member relative to the lower member. The method further includes locking the beam member and the lower member together. The method further includes positioning the second truck over the lower member and the beam member and locking a front axle assembly of the second truck to the lower member. The method further includes locking a rear frame of the second truck to the beam member and lifting the upper member. The method further includes attaching the first truck to the upper member of the towing assembly.

In another aspect, a method of storing a truck towing system is provided. The method includes providing a towing assembly having an upper member to removably connect with a first truck, a middle member, and a lower member. The middle member joins the upper member and the lower member. The lower member supports a front portion of a second truck. A beam member is engaged to the lower member. The beam member connects to a rear portion of the second truck. The method further includes retracting the beam member relative to the lower member through an interior of the lower member and through a front opening of the lower member.

DESCRIPTION OF FIGURES

FIG. 2 is a top view of the truck towing system.
FIG. 3 is a side view of the truck towing system.
FIG. 4 is a side view of the truck towing system in the collapsed configuration.
FIG. 5 is a view of the first truck towing the second truck with the truck towing system.
FIG. 6 is a side view of the connection at the rear portion of the second truck.

DETAILED DESCRIPTION OF INVENTION

Figure 1:
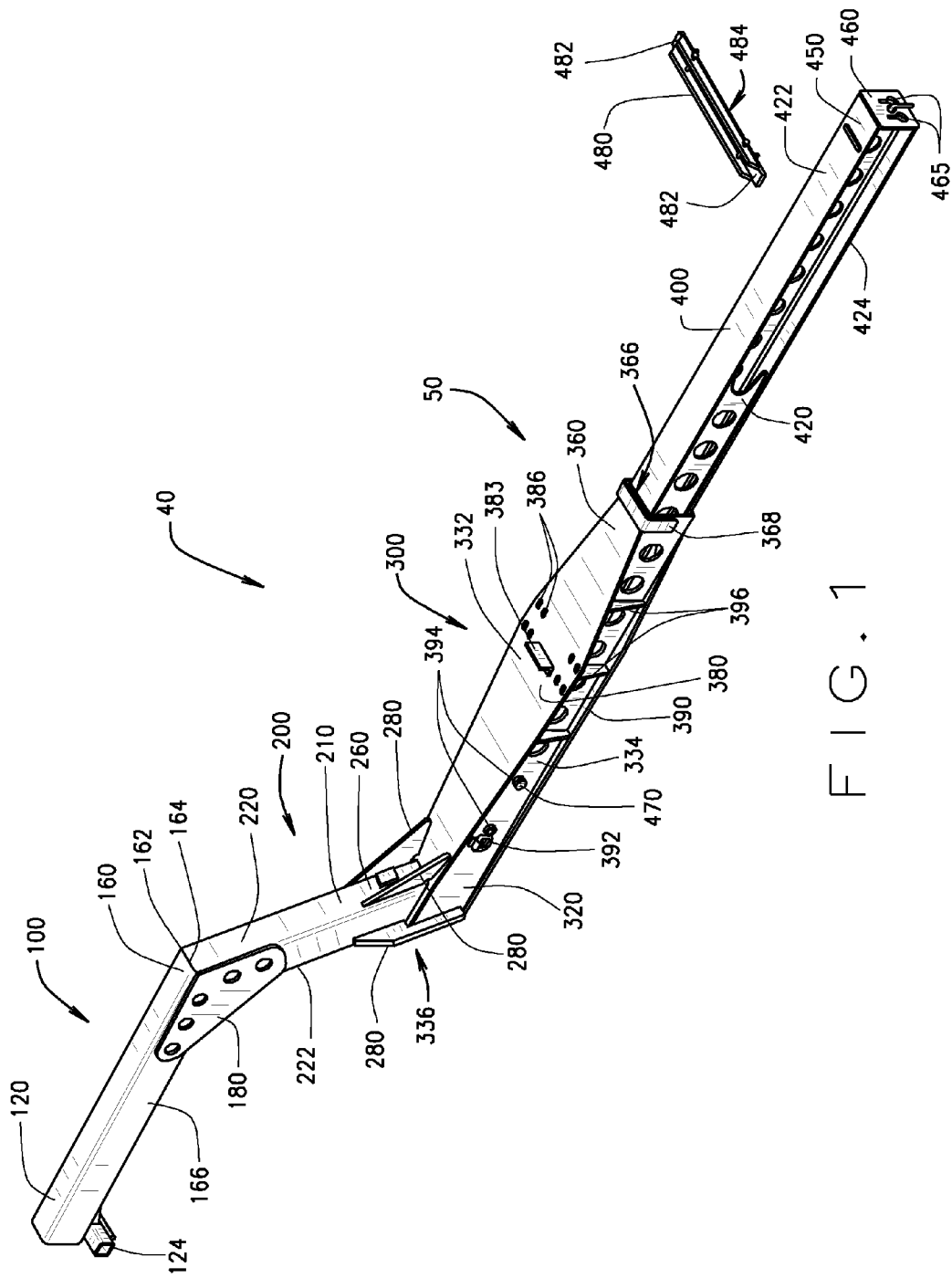
FIG. 1 is a perspective view of the truck towing system.
Figure 7:
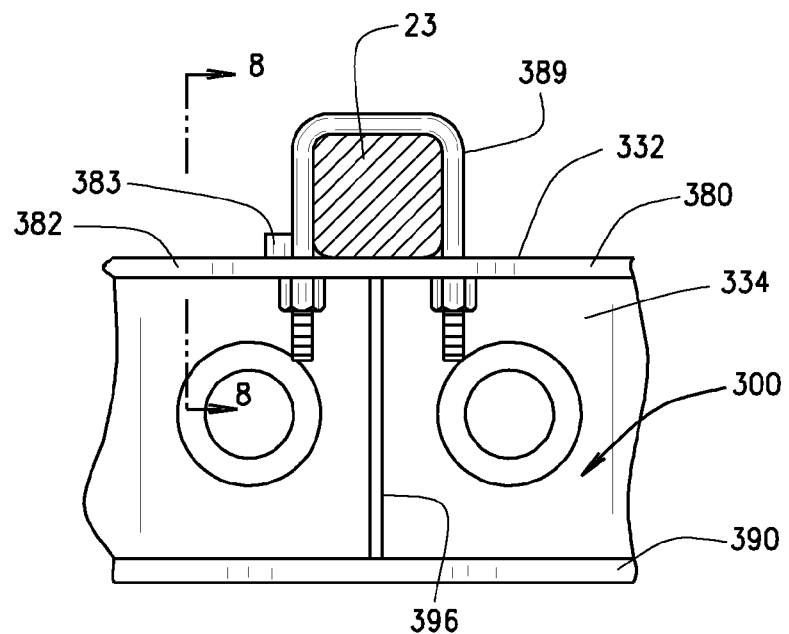
FIG. 7 is a side view of the connection at the rear portion of the second truck.

The truck towing system and assembly will now be described with reference to the FIGURES. A truck towing system 40 is shown in FIG. 1. The towing system 40 includes a truck towing assembly 50. With reference to FIG. 5, the assembly 50 connects to a rear portion of a first truck 10 and to a front portion of a second truck 20. The first truck 10 is the towing truck, while the second truck 20 is the towed truck. The second truck 20 is towed in a forward direction. A third truck may also be towed by the second truck 20 in a similar manner.

The first truck 10 includes a conventional saddle mount 15, which receives the towing assembly 50 in a fixed and locking connection. A front axle assembly 23 of the second truck 20 rests on the towing assembly 50. A rear frame 26 of the second truck 20 is locked, by chains or otherwise clamping, to the assembly 50. Rear wheels tandem 29 of the second truck 20 are in contact with the ground and roll as the first truck 10 pulls or tows the second truck 20. Accordingly, the second truck 20 is being pulled in the direction in which the second truck 20 was aerodynamically designed. As such, pulling the second truck 20 in the forward direction results in fuel economy savings as the first truck 10 is performing reduced work verses towing the second truck 20 in a backward manner.

The towing assembly 50 includes an upper member 100, a middle member 200, and a lower member 300. Each of the members 100, 200, and 300 include a generally linear length of a rigid and strong metal or metal alloy. Each of the members 100, 200, and 300 may be formed from solid, hollow or partially hollow sections of square tubing or stock. The members 100, 200, and 300 may be made from low to medium strength carbon steel. The upper member 100 is connected to the middle member 200, and the middle member 200 is connected to the lower member 300. The upper member 100, the middle member 200, and the lower member 300 may be fixedly connected to each other, or the members 100, 200 and 300 may be an integral structure. In the embodiment shown in the FIGURES, the upper member 100 is welded to the middle member 200, and the middle member 200 is welded to the lower member 300. Typically, none of the upper member 100, the middle member 200, and the lower member 300 move or pivot relative to each other.

The upper member 100 is orientated in a range of approximately parallel to the lower member 300 or slightly angling toward a plane of the lower member 300 in an amount of approximately 2 degrees to 5 degrees in the direction attaching toward the first truck 10. The upper member 100 is separated from the lower member 300 by the middle member 200. The middle member 200 joins an end of the upper member 100 with an end of the lower member 300.

The upper member 100 includes a front portion 120 and a rear portion 160. The front portion 120 connects to or attaches to the saddle mount 15 of the first truck 10. In the embodiment shown in the FIGURES, the upper member 100 includes a saddle mount portion 124 that is fixedly connected to the saddle mount 15 of the first truck 10. The saddle mount portion 124 is positioned or fixed on a bottom surface 122 of the upper member 100. The saddle mount connection between the saddle mount 15 and the saddle mount portion 124 is a fixed or non-moving engagement.

The rear portion 160 of the upper member 100 includes a rear end 162 that defines rear surfaces 164. The rear end 162 and the rear surfaces 164 are fixedly connected by welding or other fasteners to the middle member 200. The upper member 100 further includes side surfaces 166. Connecting plates 180 connect the side surfaces 166 of the upper member 100 with side surfaces 222 of the middle member 200. The connecting plates 180 strengthen or reinforce the connection or bond between the upper member 100 and the middle member 200.

The middle member 200 includes an upper portion 220 and a lower portion 260. The upper portion 220 is fixed or connected to the rear portion 160 of the upper member 100. The middle member 200 is fixed or connected to the upper member 100 at an angle of approximately 100 degrees to approximately 150 degrees. This range of angles provides for the lower member 300 to be at the proper position for connecting to the second truck 20. With reference to FIG. 3, the upper portion 220 includes an upper surface 210, the side surfaces 222, and the rear surface 230. The upper surface 210 receives angled support plates 280 in a fixed or permanent connection that further connects the middle member 200 with the lower member 300.

The lower member 300 will now be described with reference to FIG. 1. The lower portion 260 of the middle member 200 is fixed or connected to a front portion 320 of the lower member 300. The middle member 200 is fixed or connected to the lower member 300 at an angle of approximately 100 degrees to approximately 150 degrees. The lower member 300 includes the front portion 320 and a rear portion 360. The front axle assembly 23 of the second truck 20 is positioned or mounted on a top surface 332 of the lower member 300.

The lower member 300 further includes a front opening 336 and a rear opening 366. The front opening 336 is positioned below the middle member 200. A front end 410 of the stinger beam 400 is inserted into the rear opening 366 of the lower member 300. The stinger beam 400 may be inserted nearly or all the way through an interior 370 of the lower member 300. The front end 410 of the stinger beam 400 may slide or pass through the front opening 336, such that a substantial portion of the stinger beam 400 is positioned beneath the upper member 100.

The front opening 336 is provided with a reinforcing collar 338 that strengthens the front opening 336. Likewise, the rear opening 366 is strengthened with a reinforcing collar 368. The reinforcing collars 338 and 368 may circumscribe or nearly fully surround the front opening 336 and the rear opening 366, respectively The lower member 300 further includes a side surface 334. The side surface 334 defines pin openings 394. The pin openings 394 provide for a pin 470 to pass through the lower member 300 of the towing assembly 50 and through the stinger beam 400 in order to lockingly fix the stinger beam 400 in position in the interior 370 of the lower member 300. The lower member 300 further includes vertical supports 396 that further strengthen the lower member 300. The vertical supports 396 are welded to a top widened support plate 380 and to a bottom widened support plate 390.

The side surface 334 further includes chain mounting members 392 to receive a transport chain 395 or other hoisting or lifting apparatus, which may be used to lift or hoist the assembly 50. The chain mounting members 392 provide a connection point for chains or other hoisting implements in order for an operator to attach or connect to the towing assembling 50 and lift the towing assembly 50.

With reference to FIG. 1, the top widened support plate 380 is shown. The top widened support plate 380 includes an axle stop 383 and holes 386. In the embodiments shown in the FIGURES, U clamps 389 pass over the front axle assembly 23 and insert through the holes 386 and are fastened in place with locking nuts, locking pins, etc. The top widened support plate 380 provides a broad surface for the front axle assembly 23 to rest upon. As the top widened support plate 380 widens as it approaches the axle stop 383, a broad base is provided for the front axle assembly 23 of the second truck 20 that reduces rocking or shaking of the second truck 20 when it is positioned on the top widened support plate 380 of the lower member 300.

A lower surface of the top widened support plate 380 is welded to the vertical supports 396, while an upper surface of the bottom widened support plate 390 is welded to the vertical supports 396. The vertical supports 396 are further welded to the side surfaces 334 of the lower member 300. In other embodiments, the front axle assembly 23 may be positioned on the top widened support plate 380 and fastened with chains, bolts, fasteners, or other conventional mechanical apparatus that may be used to attach the front axle assembly 23 to the lower member 300.

The stinger beam 400 will now be described with reference to FIGS. 1 and 4. The stinger beam 400 includes the front end 410 and the rear end 450. As shown in FIG. 4, pin openings 430 are positioned on an exterior of the stinger beam 400 and travel through the interior width of the stinger beam 400. The stringer beam 400 may include an I-beam construction with an upper surface 422 and a lower surface 424. A vertical support plate 420 further supports the upper surface 422 and the lower surface 424 of the stinger beam 400. The vertical support plate 420 reinforces and strengthens the stinger beam 400.

A crossbar 480 assists in connecting a rear portion of the second truck 20 to the assembly 50. The rear end 450 of the stinger beam 400 includes a chain receiving member 460 that is fixedly attached to the crossbar 480. A chain 490 connects lateral portions 482 of the crossbar 480 to the chain receiving member 460. The crossbar 480 rests on a rear frame 26 of the second truck 20. Specifically, a bottom surface 484 of the crossbar 480 rests over the top of the rear frame 26, while the chain 490 holds the stinger beam 400 to the crossbar 480. The chain receiving number 460 may be attached or integral in a fixed engagement to the rear end 450 of the stinger beam 400. The chain receiving member 460 includes the chain openings 465 that receive the chain 490. In other embodiments, the chain receiving member 460 may include other mechanical structure or components to affix to the chain 490. The length of the chain 490 may be adjusted to raise or lower the rear of second truck 20. Generally, the front and rear sets of the rear wheels tandem 29 of the second truck 20 should be in contact with the ground to provide better control and braking of the second truck 20. The length of chain 490 between the crossbar 480 and the chain receiving member 460 may be lengthened to lower the front set of the rear wheels tandem 29. Likewise, the length of chain 490 between the crossbar 480 and the chain receiving member 460 may be shortened to raise the front set of the rear wheels tandem 29.

Figure 8:
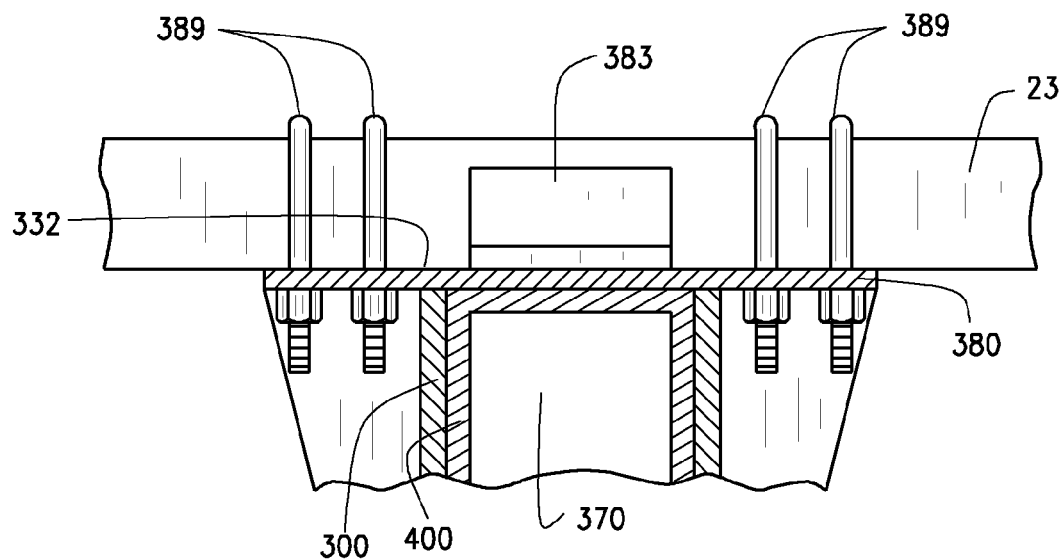
FIG. 8 is a front view of the connection at the rear portion of the second truck.
Figure 9:
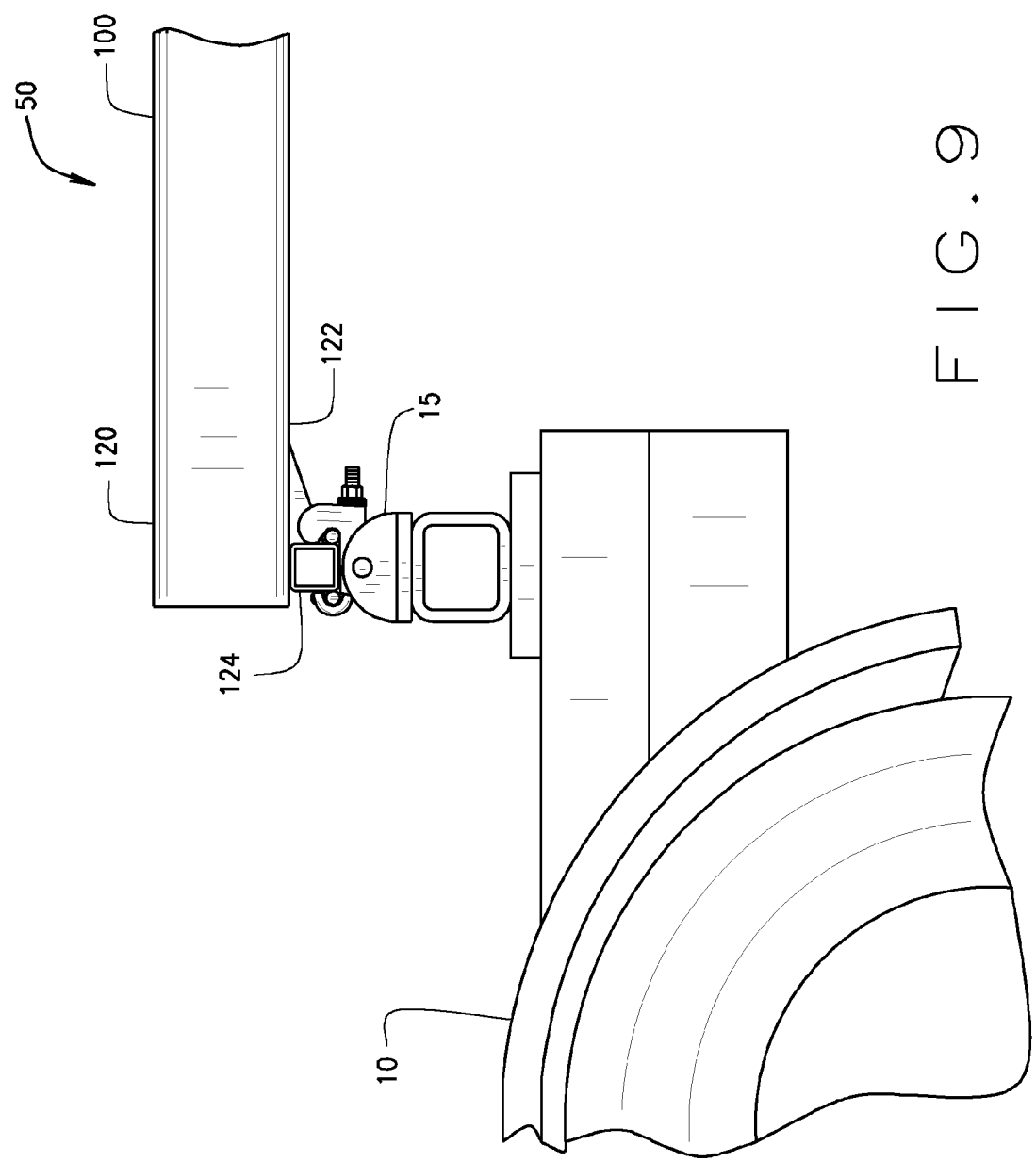
FIG. 9 is a side view of the connection at the rear portion of the first truck.

With reference to FIG. 4, the stinger beam 400 is adjustable in length relative to the lower member 300. The overall length of the towing assembly 50 may be adjusted by extending and withdrawing the stinger beam 400 relative to the lower member 300. The stinger beam 400 slides in and out of the interior 370 of the lower member 300. The upper surface 422 and the lower surface 422 of the stinger beam 400 may slide against the interior surfaces of the lower member 300. The circumference or outer surfaces of the stinger beam 400 should be just smaller than the interior circumference or inner surface of the lower member 300 such that the stinger beam 400 is held in a secure engagement. As shown in FIG. 8, the lower member 300 and stinger beam 400 may have box or square cross-sections that provide support and strength to the assembly 40. The operator may select one of the one or more sets of the pin openings 394 that are spaced along the length of the lower member 300. The operator may further choose one of the one or more sets of the pin openings 430 along the length of the stinger beam 400. This allows a range of length of the towing assembly 50 that may be used to accommodate different size or types of semi-trucks.

Importantly, the stinger beam 400 may be withdrawn through the interior 370 of the lower member 300 and through the front opening 336 such that much of the stinger beam 400 is directly underneath the upper member 100. This allows the towing assembly 50 to collapse into a more convenient storage size. The towing assembly 50 may further lock in the collapsed configuration.

The towing assembly 50, by virtue of the extendable stinger beam 400, provides a range of extension between 0 and approximately 3 linear feet to accommodate a variety of different semi-trucks. When the towing assembly 40 is in the fully extended configuration, it has an overall length of approximately 18 feet. When the towing assembly 40 is in the collapsed configuration, it has an overall length of approximately 10 feet.

The semi-trucks that may be towed with the towing saddle system 40 may weigh approximately 5,000 to approximately 10,000 pounds. The towing assembly 50 may weigh approximately 1,600 pounds. The stinger beam 400 includes at least one set of the pin openings 430 and may include up to five or six sets of the pin openings 430. The lower member 300 includes at least one set of the pin openings 394 and up to approximately five or six sets of the pin openings 394.

The method of operation of the towing system 40 will now be described. First, the towing assembly 50 is laid flat on the ground. The stinger beam 400 is extended or retracted relative to the lower member 300 until it is at the proper length for the second truck 20. The pin 470 is then inserted through the pin openings 394 in the lower member 300 and through the pin openings 430 of the stinger beam 400. The pin 470 is locked in place via a cotter pin, nut or the like. Next, the second truck 20 is driven over the lower member 300 and the stinger beam 400. Next, the U clamps 389 are positioned over the front axle assembly 23 and tightened such that the front axle assembly 23 is clamped or fixed to the lower member 300. Next, the crossbar 480 is passed over the rear frame 26 of the second truck 20, and the chain 490 connects the crossbar 480 with the chain receiving member 460.

A crane, hoist, or other lifting implement next lists the upper member 100 to a sufficient height to where the first truck 10 may back or move underneath the saddle mount portion 124. Next, the upper member 100 is lowered until the saddle mount portion 124 of the towing assembly 50 is positioned in the saddle mount 15 of the first truck 10. The saddle mount 15 is then locked to the saddle mount portion 124. As such, the towing system 40 is now connected to the first truck 10, and the second truck 20 is supported via the towing system 40. The rear wheels tandem 29 of the second truck 20 are in contact with the ground, while the front wheels 27 of the second truck 20 are approximately 6" to approximately 12" off and above the ground.

With reference to FIG. 4, the towing assembly 50 collapses to a collapsed configuration for efficient storage and convenient maneuverability. The stinger beam 400 is withdrawn or retracted through the interior 370 of the lower member 300 and through the front opening 336 such that much of the stinger beam 400 is directly underneath the upper member 100. The stinger beam 400 may be locked in place with the pin 470. In this collapsed configuration, a center of gravity of the towing assembly 50 is positioned approximately in the middle of the collapsed towing assembly 50. The chain mounting members 392 provide the connection point for chains or other hoisting implements in order for an operator to attach or connect to the towing assembling 50 and lift the towing assembly 50. Thus, towing assembly may be safely lifted at its middle point without the towing assembly 50 twisting or torqueing on the transport chain 395. Due to it compact size, up to approximately 25 of the towing assemblies 50 may be stored on a standard flat bed trailer.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed:

1. A truck towing system, comprising:
an upper member to removably connect with a first truck;
a middle member;
a lower member, wherein the middle member joins the upper member and the lower member in a fixed engagement;
the lower member comprising a top widened support plate to support a front portion of a second truck, wherein the top widened support plate comprises an axle stop and receives a front axle assembly of the second truck; the lower member further includes a bottom widened support plate, and vertical supports are welded to the top widened support plate and the bottom widened support plate;
a beam member, the beam member engaged to the lower member, wherein the beam member slides in and out of an interior of the lower member;
the lower member comprising one or more sets of openings that are spaced along a length of the lower member, and the beam member comprises one or more sets of pin openings that are spaced along a length of the beam member, and a locking pin passes through one of the sets of the openings in the lower member and one of the sets of the pin openings in the beam member to lock the beam member and the lower member together; and,
the beam member to connect to a rear portion of the second truck.

2. The truck towing system according to claim 1, wherein the upper member, the middle member, and the lower member are fixedly connected to each other with the middle member positioned between the upper member and the lower member, and the upper member is above the lower member.

3. The truck towing system according to claim 1, wherein the beam member includes an upper surface and a lower surface, and a vertical support plate supports the upper surface and the lower surface.

4. The truck towing system according to claim 1, wherein the lower member and the beam member have a box or square cross-section.

5. The truck towing system according to claim 1, wherein an outer surface of the beam member is just smaller than an inner surface of the lower member such that the beam member is held in a secure engagement.

6. The truck towing system according to claim 1, wherein the truck towing system is adjustable in length by extending or retracting the beam member relative to the lower member.

7. The truck towing system according to claim 1, wherein the beam member slides in and out of a rear opening of the lower member.

8. The truck towing system according to claim 1, wherein the truck towing system converts to a collapsed configuration and an extended configuration.

9. The truck towing system according to claim 1, wherein the top widened support plate receives the front axle assembly of the second truck, and a clamp locks the front axle assembly of the second truck to the lower member.

10. The truck towing system according to claim 1, the truck towing system according to claim 1, wherein the top widened support plate comprises the axle stop and holes, and clamps lock the front axle assembly of the second truck to the lower member via the holes.

11. The truck towing system according to claim 1, wherein the locking pin passes through a width of the beam member.

12. The truck towing system according to claim 1, wherein a side surface of the lower member includes chain mounting members to connect to a transport chain.

13. The truck towing system according to claim 1, wherein the middle member is fixedly connected to the upper member at an angle of approximately 100 degrees to approximately 150 degrees, and, wherein the lower member is fixedly engaged to the middle member at an angle of approximately 100 degrees to approximately 150 degrees.

14. The truck towing system according to claim 1, wherein the upper member is orientated to the lower member in a range of approximately parallel to the lower member to angling toward a plane of the lower member in an amount of approximately 2 degrees to 5 degrees.

15. The truck towing system according to claim 1, wherein a rear opening includes a reinforcing collar.

16. A truck towing system, comprising:
an upper member to removably connect with a first truck;
a middle member;
a lower member, wherein the middle member joins the upper member and the lower member in a fixed engagement;

the lower member comprising a top widened support plate to support a front portion of a second truck, the lower member further includes a bottom widened support plate, and vertical supports are welded to the top widened support plate and the bottom widened support plate;

a beam member, the beam member engaged to the lower member, wherein the beam member slides in and out of an interior of the lower member;

the lower member comprising one or more sets of openings that are spaced along a length of the lower member, and the beam member comprises one or more sets of pin openings that are spaced along a length of the beam member, and a locking pin passes through one of the sets of the openings in the lower member and one of the sets of the pin openings in the beam member to lock the beam member and the lower member together;

the beam member to connect to a rear portion of the second truck; and, wherein a rear end of the beam member includes a chain receiving member that fixedly attaches to a crossbar, and a chain connects lateral portions of the crossbar to the chain receiving member, and the crossbar rests on a rear frame of the second truck.

17. The truck towing system according to claim 16, wherein lengthening or shortening the chain lowers or raises the rear portion of the second truck.

18. A truck towing system, comprising:

an upper member to removably connect with a first truck;

a middle member; the middle member is fixedly connected to the upper member at an angle of approximately 100 degrees to approximately 150 degrees;

a lower member, the lower member is fixedly engaged to the middle member at an angle of approximately 100 degrees to approximately 150 degrees;

wherein the middle member joins the upper member and the lower member;

the upper member is orientated to the lower member in a range of approximately parallel to the lower member to angling toward a plane of the lower member in an amount of approximately 2 degrees to 5 degrees;

the lower member to support a front portion of a second truck, the lower member comprising a widened support plate with an axle stop;

a beam member, the beam member engaged to the lower member;

the lower member defines an interior to receive the beam member;

the beam member connects to a rear portion of the second truck; and, the lower member comprises one or more sets of openings that are spaced along a length of the lower member, and the beam member comprises one or more sets of pin openings that are spaced along a length of the beam member, and a locking pin passes through one of the sets of the openings in the lower member and one of the sets of the pin openings in the beam member to lock the beam member and the lower member together.

19. A truck towing system, comprising:

an upper member to removably connect with a first truck;

a middle member;

a lower member, wherein the middle member joins the upper member and the lower member in a fixed engagement;

the lower member comprising a top widened support plate to support an axle assembly of a second truck;

a clamp to engage the axle assembly to the top widened support plate;

the beam member engaged to the lower member, wherein the beam member slides in and out of an interior of the lower member;

wherein the lower member comprises one or more sets of openings that are spaced along a length of the lower member, and the beam member comprises one or more sets of pin openings that are spaced along a length of the beam member, and a locking pin passes through one of the sets of the openings in the lower member and one of the sets of the pin openings in the beam member to lock the beam member and the lower member together; and, the beam member to connect to a rear portion of the second truck, wherein the rear end of the beam member includes a chain receiving member that fixedly attaches to a crossbar, and a chain connects to lateral portions of the crossbar to the chain receiving member, and the crossbar rests on a rear frame of the second truck.

* * * * *